United States Patent
Preston et al.

(10) Patent No.: US 8,573,975 B2
(45) Date of Patent: Nov. 5, 2013

(54) BEAM SHAPING FOR OFF-AXIS BEAM DETECTION IN TRAINING ENVIRONMENTS

(75) Inventors: Steven Preston, Winter Springs, FL (US); Thomas H. Penner, Apopka, FL (US); Thomas C. Penrose, Oakland, FL (US); Richard D. O'Neal, Winter Springs, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 730 days.

(21) Appl. No.: 12/684,723

(22) Filed: Jan. 8, 2010

(65) Prior Publication Data
US 2011/0171610 A1 Jul. 14, 2011

(51) Int. Cl.
*F41G 3/26* (2006.01)

(52) U.S. Cl.
USPC .................................. 434/21; 434/19; 434/22

(58) Field of Classification Search
USPC ............... 434/11–27; 463/2, 5; 359/707, 754; 356/4.03
See application file for complete search history.

(56) References Cited

U.S. PATENT DOCUMENTS

| 6,863,532 B1* | 3/2005 | Ambrosoli ...................... 434/11 |
| 6,914,731 B2* | 7/2005 | Fredriksson ................... 359/754 |
| 2005/0147945 A1* | 7/2005 | Lampl ............................. 434/11 |

OTHER PUBLICATIONS

Mi, L., et al. "Shaping Semiconductor Laser Beam with One-Dimension Gradient-Index Lens," Int'l Symposium on Instrumentation Science and Technology, Journal of Physics: Conference Series, vol. 48, pp. 785-789, 2008.

* cited by examiner

*Primary Examiner* — Timothy A Musselman
(74) *Attorney, Agent, or Firm* — Jetter & Associates, P.A.

(57) ABSTRACT

A firing apparatus includes a light generating device for emitting a modulated light beam that includes information regarding the firing apparatus upon triggering in a direction toward a target. Lens optics is positioned in a path of the modulated light beam including a one dimensional lens for beam shaping the modulated light beam to provide a shaped modulated beam including a low divergence horizontal beam portion and a vertically elongated beam portion. A combat training system includes a head mounted apparatus including at least one photodetector affixed. The vertically elongated beam portion allows the light beam generated by the firing apparatus to be aimed at the torso of the target and be detected by photodetectors that are exclusively on the helmet.

17 Claims, 4 Drawing Sheets

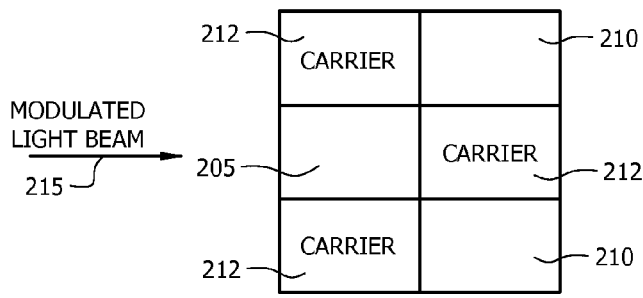
FIG. 2A
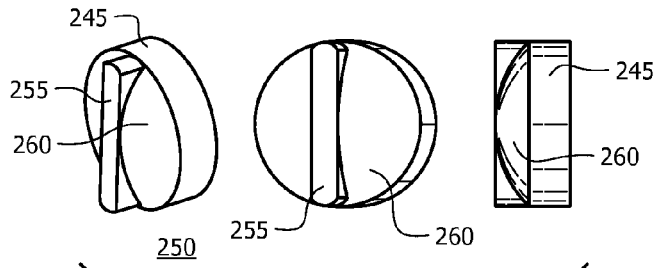
FIG. 2B
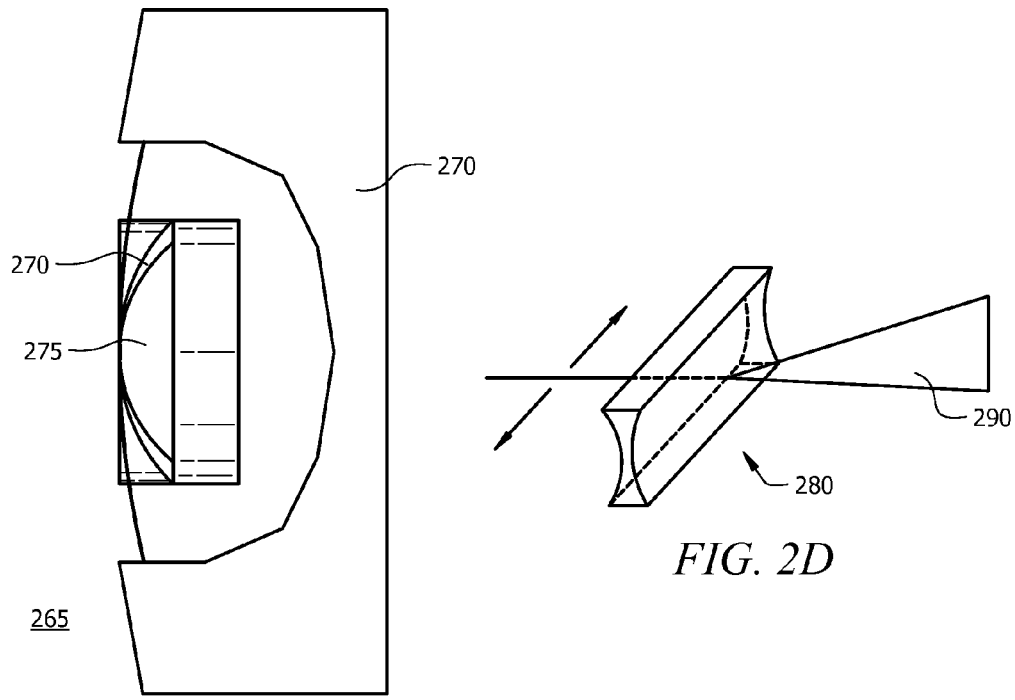
FIG. 2C
FIG. 2D

BEAM SHAPING FOR OFF-AXIS BEAM DETECTION IN TRAINING ENVIRONMENTS

FIELD

Disclosed embodiments generally relate to training including combat training.

BACKGROUND

Training can enhance the skill of individuals by repetition and developing appropriate responses to various situations. In the combat context, combatants may conduct various types of training exercises in order to prepare for scenarios that can be anticipated in actual combat situations.

The Multiple Integrated Laser Engagement System (MILES) is a system designed for combatants involved in training exercises in order to provide a realistic training battlefield environment. The MILES system includes simulated offensive weapons, such as firearms, that provides tactical engagement simulation for direct fire force-on-force training by emitting relatively harmless near infrared (e.g., eye-safe) line-of-sight "bullets" generated by one or more light emitting diodes (LED) or lasers.

The "bullets" are sent in the form of pulses that transmit weapon information to the target. These pulses are transmitted each time the weapon is fired with a blank or blanks to simulate the firing of an actual round or multiple rounds. An audio sensor or a photo-optic sensor typically detects the firing of the blank round(s) and simultaneously energizes an LED or laser to emit the beam of "bullets" toward the target which is in the conventional sights of the weapon.

Information contained in the pulses (such as by intensity modulation) generally includes the combatant (e.g., player) identification (e.g., player identification (PID) code) and the type of weapon used so that the identity of a combatant who has made a "kill" can be ascertained. Each individual and vehicle (each can be considered a combatant) in the training exercise has a detection system to sense hits, player units and control systems which include a microprocessor based control circuit for processing the signals from the photodetectors to determine if there has been a hit, the type of weapon registering the hit, and the identity of the shooter. Transmitters are attached to each individual and vehicle weapon system target that transmits a casualty assessment that is calculated based on the actual ranges and lethality of the specific weapon systems. After performing casualty assessment, a control circuit provides status information to the player, indicating on a display whether the player has been "killed". MILES training has been proven to dramatically increase the combat readiness and fighting effectiveness of military forces.

In conventional force-on-force training, a cluster of photodetectors on a target must be placed near the center of mass (i.e. center of the torso) so that a beam firing "bullet" at that point can be detected. The number of photodetectors and the separation between each photodetector in a cluster is dependent on the beam characteristics at the minimum range to be used in the training exercise because the beam size of the "bullets" from the transmitter (e.g., LED or laser transmitter) starts off very small (e.g., few mm in dimension) and continuously expands as it moves away from the transmitter.

In order to insure that the beam does not hit a target position between photodetectors, and thus not be detected, a plurality of target photodetectors are conventionally placed very close to the center of mass in a cluster. However, photodetector placements clustered around the center of a chest do not support an aim point near the neck or head so that additional photodetectors must be placed in those areas if a complete simulation is desired at all ranges. For example, combatants may be fitted with photodetectors on both the helmet and the body harness attached to the torso for detecting "bullet" hits. Unfortunately, such an implementation requires a large number of expensive photodetectors, battery power to each photodetector, as well as complex internal wiring.

SUMMARY

This Summary is provided to comply with 37 C.F.R. §1.73, presenting a summary of the invention to briefly indicate the nature and substance of the invention. It is submitted with the understanding that it will not be used to interpret or limit the scope or meaning of the claims.

Disclosed embodiments describe firing apparatus that include lens optics that output a shaped modulated beam having a low divergence horizontal beam portion in a horizontal direction and a vertically elongated beam portion in a vertical direction that allows target sensitivity to the beam throughout substantially the entire transmission length. As used herein, a "low divergence horizontal beam portion" corresponds to a beam divergence of ≤1 degree in a direction along the horizontal plane, while a "vertically elongated beam portion" in a vertical direction corresponds to a beam divergence of ≥10 degrees, thus having a divergence that is at least 10 times larger than the horizontal divergence.

Lens optics comprising a one dimensional lens for beam shaping is positioned in a path of a modulated light beam to provide a shaped modulated beam. In one embodiment the lens optics comprises a multi-lens arrangement that directs a portion of the energy of the transmitted beam to produce the vertically elongated beam portion. The multi-lens arrangement comprises (i) a converging lens and (ii) a one dimensional lens having aligned centers and non-overlapping optics. The one dimensional lens provides a vertically elongated beam portion in a vertical direction and the converging lens provides a low divergence horizontal beam portion along the horizontal plane. In one embodiment the composite lens comprises a hybrid lens in which the lens elements share an identical lens center to provide coaxial alignment of the vertically and horizontally oriented beam portions.

In another embodiment, the lens optics consists of a one dimensional lens that comprises a negative lens which is aligned to provide the vertically elongated portion and to not affect the modulated light beam in said horizontal direction, such as a cylinder lens having its longitudinal axis oriented along the horizontal plane.

Beam shaping enables light transmitted by a light generating device aimed at the center of a torso of a standing target, such as a human or pop-up target, to have a dimension in the vertical direction to be sufficient (e.g., on the order of 1 meter, or more) so that the vertical beam portion also reaches the head of the target, even at relatively close positions (i.e. short distances), such as <100 meters, typically <10 meters. The disclosed beam shaping allows the target in the training operation or combat game to have their photodetectors exclusively on a head mounted apparatus, so that a conventional H-shaped vest equipped with a cluster of photodetectors is no longer needed.

A combat training or interactive gaming system includes a head mounted apparatus including at least one photodetector affixed. The head mounted apparatus can be placed on a head (or incorporated in a "head" portion of a non-living target) of at least one target. A firing apparatus can generate optical beans, which are selectively detectable by the photodetector of the head mounted apparatus, when the firing apparatus is fired and aimed at the target. The lens optics in the firing apparatus provides a low divergence horizontal beam portion, and at the same time the vertically elongated beam portion which allows the photodetector center to be remote (e.g., on the head of a target) from the center of the beam being transmitted (e.g., at a torso of the target), thus enabling use of head only photodetectors, even for close position hits.

BRIEF DESCRIPTION OF THE DRAWINGS

FIG. 2A is a cross sectional depiction of an exemplary multi-lens arrangement shown as a compound lens that includes a one dimensional lens attached to a converging lens, according to a disclosed embodiment.

FIG. 2B provides several depictions provided at different rotations of an exemplary multi-lens arrangement shown as a hybrid lens that includes a one dimensional positive lens integrated with a converging lens, according to another disclosed embodiment.

FIG. 2C is a depiction of an exemplary multi-lens arrangement shown as a hybrid lens that includes a curved one dimensional lens shown as a curved cylinder lens that provides a short range extended beam portion in a vertical direction that has reduced beam divergence compared to that provided by the hybrid lens shown in FIG. 2B, according to a disclosed embodiment.

FIG. 2D provides a depiction of a one dimensional negative lens for generating a vertically elongated beam portion from a low divergence modulated beam while not affecting the low divergence horizontal beam portion, according to another disclosed embodiment.

FIGS. 3A-C show depictions of the resulting beam profile and hit profile using wide beam divergence light source for different lens embodiments, wherein FIG. 3A is based on a conventional spherical converging lens, FIG. 3B is based on a composite or hybrid lens that includes a straight cylinder lens, such as shown in FIG. 2B, and FIG. 3C is based on a composite or hybrid lens that includes a curved cylinder lens, such as shown in FIG. 2C.

DETAILED DESCRIPTION

Figure 1:
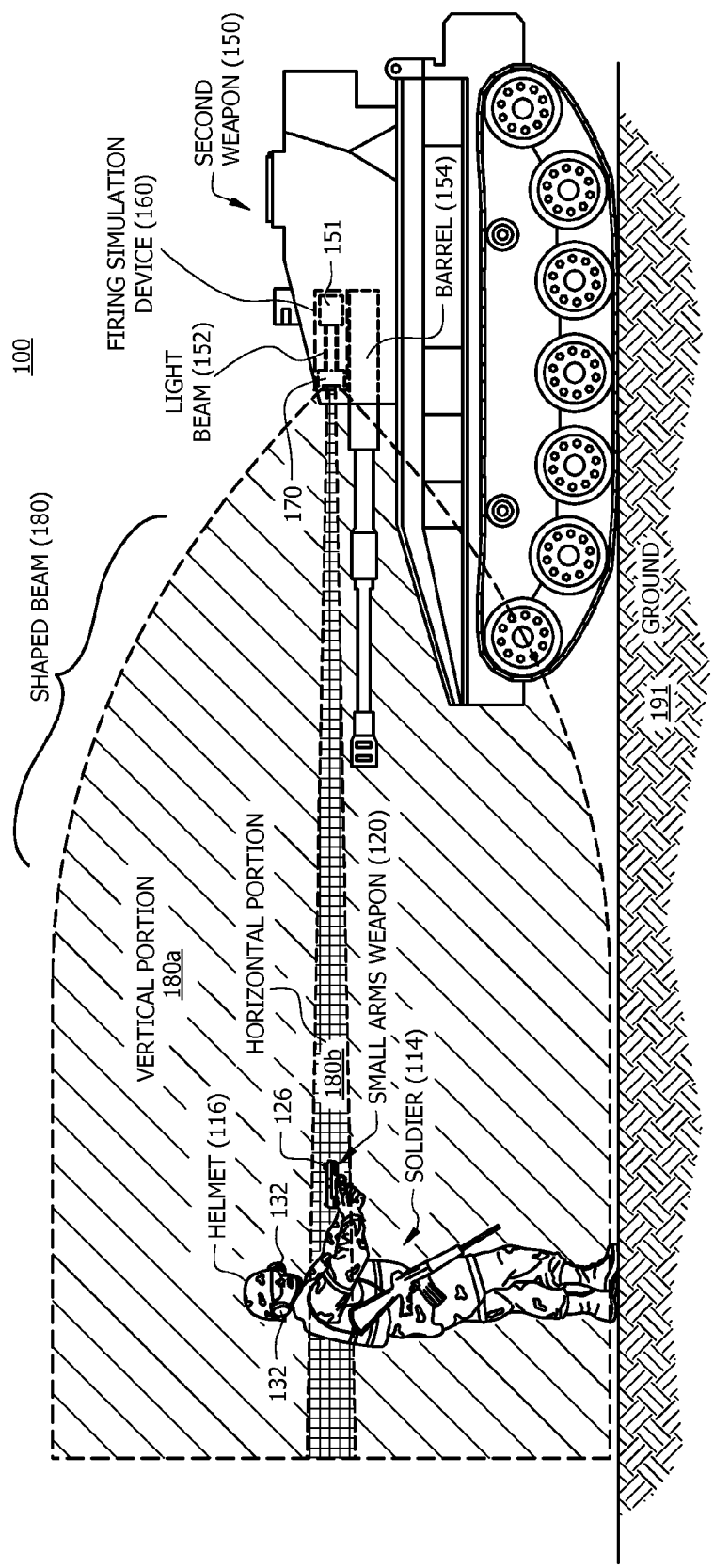
FIG. 1 is a depiction of a combat training or gaming system during a training exercise or gaming session, according to a disclosed embodiment.

Disclosed embodiments are described with reference to the attached figures, wherein like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments. One having ordinary skill in the relevant art, however, will readily recognize that the disclosed embodiments can be practiced without one or more of the specific details or with other methods. In other instances, well-known structures or operations are not shown in detail to avoid obscuring the disclosed embodiments. The disclosed embodiments are not limited by the illustrated ordering of acts or events, as some acts may occur in different orders and/or concurrently with other acts or events. Furthermore, not all illustrated acts or events are required to implement a methodology in accordance with disclosed embodiments.

FIG. 1 is a depiction of a combat training or gaming system 100 during a training exercise or gaming session, according to a disclosed embodiment. A target 114, shown as a combatant (e.g., soldier) 114, is shown standing and carrying a firing apparatus (e.g., small arms weapon) 120 that includes a small arms transmitter 126. Firing apparatus 120 can comprise an M16 rifle or a machine gun, for example. The target 114 wears or includes a head mounted apparatus (helmet) 116 that includes a plurality of photodetectors 132 (e.g., disk shaped optical infrared photodetectors) around its perimeter that perform a receiver function. Photodetectors 132 can comprise a charge coupled device (CCD) camera or a complementary metal-oxide semiconductor (CMOS) camera, which both can be obtained or otherwise configured (e.g., removal of the "hot" filter from a commercially available color camera) to detect light at invisible (e.g., NIR) wavelengths.

Beam shaping described herein enables light transmitted from a firing apparatus triggered in a training exercise or gaming scenario aimed at the torso of the combatant while standing to also generally reach the head of the combatant allowing detection by photodetectors 132, in a relatively short distance, such as <100 meters, typically <10 meters. This arrangement is not limited to human shaped targets 116, but can apply to any targets including vehicles, obstructions, in-animate objects, and the like. It can be seen that combatant 114 shown in FIG. 1 does not wear a conventional H-shaped vest equipped with a set of photodetectors. However, in certain arrangements, the beam profile may not actually reach the head area of the soldier from center of mass, but will still provide a substantial advantage by providing a larger, more acceptable hit profile.

A second firing apparatus (e.g., second weapon) 150 includes a barrel 154 for shooting a projectile (which may be disabled or otherwise non-functional during a training exercise or interactive game) and a firing apparatus (e.g., firing simulation device) 160 is affixed to the barrel 154. Firing apparatus 160 comprises a light generating device 151 that includes a modulator such as an acousto-optic modulator (AOM) to emit a modulated light beam 152 generally in the form of invisible light pulses, such as infrared (IR) light pulses, upon triggering that includes information regarding the second weapon 150. The light generating device 151 generally comprises a semiconductor laser such as a laser diode, or an LED that, for MILES compliant applications, emits in the near IR, e.g., at about 904 nm. The second weapon 150 is shown aimed in a direction toward the target 114, specifically towards the target's center of mass, which is near the center of his or her torso.

A laser diode is a light emitting diode with an optical cavity to amplify the light emitted from the band gap that exists in certain semiconductors. Due to diffraction, the beam from a laser diode diverges (expands) rapidly after leaving the laser diode chip, typically providing a characteristic divergence of 30 to 40 degrees in one direction (horizontal or vertical depending on the application) and 10 degrees in the other direction. Conventional commercially available laser diode modules include a converging lens, such as a D-shaped lens to provide collimated beam outputs having near-diffraction-limited performance, that with careful bonding avoids bowing in the lens to transform the up to 40 degrees of divergence (in the vertical direction) to 1 degree (about 17.6 mrad) or less (e.g., 10 mrad or about 0.57 degrees) of divergence. As described below, disclosed embodiments can utilize either a highly divergent source such as a non-lensed laser diode (thus providing its characteristic divergence), or a relatively low divergence light source, such as a laser diode module with lens or other low divergence lasers.

Lens optics 170 is positioned in a path of the modulated light beam 152 for beam shaping to provide a shaped modulated beam 180. The modulated light beam 152 exiting light generating device 151 has a divergence depending on the light generating device, and in the case of a laser diode, whether the laser diode is lensed (e.g., light generating device 151 comprises a laser diode module) or not. When light generating device 151 comprises a laser diode and is not lensed, as described above, the beam divergence provided is characteristic of the divergence of the particular source, such as 30 to 40 degrees in one direction (e.g., vertically) and at least about 10 degrees in the other direction (e.g., horizontally). When light generating device 151 is a low divergence device, the beam divergence is generally around 10 mrad (about 0.57 degrees), or less, in both the vertical and horizontal direction.

As described in more detail below with reference to FIGS. 2A-2B lens optics 170 can comprise a multi-lens arrangement that includes (i) a converging lens and (ii) a one dimensional lens that have non-overlapping optics and aligned centers, and in the hybrid embodiment shown in FIG. 2B, (i) and (ii) share a common lens center. As depicted in FIG. 1, the shaped modulated beam 180 provides a low divergence horizontal beam portion 180(*b*) in the horizontal direction (the horizontal plane is parallel to the ground 191 shown in FIG. 1) and a vertically elongated beam portion 180(*a*) in the vertical direction. Such beam shaping enables light transmitted from firing apparatuses such as firing apparatus 150 triggered in a training exercise or interactive gaming situation to be a single beam (i.e. originating from a single light generating device 151), such as modulated beam 180 aimed at the torso of a target (e.g., as opposed to 2 or more beams from 2 or more light generating devices, or a heavily offset single beam) to also reach the head of the target when standing in a relatively short distance, such as <100 meters, typically <10 meters.

As noted above, the beam shaping described herein allows the combatants in the training operation to have photodetectors exclusively on their helmet, so that a conventional H-shaped vest equipped with a cluster of photodetectors is not needed. The ability to have a head-only detection significantly increases the invisibility of the target instrumentation on target personnel which is generally desirable.

FIG. 2A is a cross sectional depiction of an exemplary multi-lens arrangement 200 shown as a compound lens having aligned centers that includes a one dimensional lens 205. Multi-lens arrangement 200 provides a short range extended beam portion in a vertical direction, such as short range extended beam portion 180(*a*) shown in FIG. 1, attached to a converging lens 210 that provides a long range small divergence beam along a horizontal plane such as long range small divergence beam portion 180(*b*) shown in FIG. 1. Although shown being physically attached in FIG. 1, one dimensional lens 205 and converging lens 210 may be spaced apart from one another in other embodiments. Modulated light beam is shown in FIG. 2A as reference 215. When using a light source that provides significant beam divergence, such as a non-lensed laser diode, optics spacing and sizes are such that the size of the modulated light beam 215, upon incidence on multi-lens arrangement 200, is approximately the same size as the area of multi-lens arrangement 200.

The carrier portions 212 shown in FIG. 2A provide little or no refraction (e.g., have flat surfaces), that instead provide mechanical support and physical dimensions for the respective lenses 205 and 210 and thus for multi-lens arrangement 200 overall. This arrangement is analogous to a lenticular lens well known for corrective lens applications where a lens is usually of strong refractive power, in which the prescribed power is provided over only a limited central region of the lens referred to as the lenticular portion, with the remainder of the lens referred to as the carrier, which provides little or no refraction. Carrier portions 212 thus provide non-overlapping optics for one dimensional lens 205 and converging lens 210.

The function and orientation of one dimensional lens 205 depends on whether the incident light beam light provides a large or a small beam divergence. In the case the incident light beam light has a large divergence (non-lensed laser diode), one dimensional lens 205 provides focusing power in the horizontal direction, but does not affect the light beam (i.e. has no power) in the vertical direction. For example, a cylinder lens aligned so that its longitudinal axis is in the vertical direction provides focusing power in the horizontal direction, but does not affect the light beam in the vertical direction. As a result, since the light beam is unaffected by carrier 212 portion of lens 210, the divergence of the modulated light beam in the vertical direction will be the characteristic (large) divergence of the light source in that direction, such as 30 to 40 degrees vertically for an non-lensed laser diode.

In the case the incident light beam light has a small divergence, one dimensional lens 205 can be embodied as a negative lens that is aligned to provide vertical beam expansion (e.g., a line-shaped light beam portion), but not affect the light beam (i.e. has no power) in the horizontal direction. For example, a cylinder lens aligned so that its longitudinal axis is along the horizontal plane provides vertical beam expansion (analogous to a "light sheet"), but does not affect the light beam in the vertical direction. As a result, a one dimensional lens aligned in this way provides a light sheet in the vertical direction with the light beam portion in the horizontal plane having the low divergence of the light source.

One dimensional lens 205 can comprise a cylinder lens in one embodiment. As known in optics, cylindrical lenses have at least one surface that is formed like a portion of a cylinder. Embodied as a plano-convex lens, the cylinder lens has a positive focal length that can be used to focus light in one direction (e.g., horizontal direction) as described above when the light source provides a large divergence light beam. Embodied as a plano-concave lens, the cylinder lens has a negative focal length that can be used to spread light in one dimension (e.g., vertical) as described above. Embodied as a cylinder lens, the one dimensional lens can comprise a Fresnel cylinder lens, which comprises a collapsed version of a conventional cylinder lens. One dimensional lens 205 can also comprise one dimensional lens types other than cylinder lenses, including a one dimensional gradient index (GRIN) lens (see "Shaping Semiconductor Laser Beam with One-Dimension Gradient-Index Lens" by Mi, et al. Journal of Physics: Conference Series 48 (2006) 785-789), or a sawtooth or alligator lens.

Converging (or positive) lens 210 can comprise a plano-convex or a biconvex lens. As known in the art of optics, biconvex or plano-convex lenses are defined by their operation wherein a collimated or parallel beam of light travelling parallel to the lens axis and passing through the lens will be converged (or focused) to a spot on the axis, at a certain distance behind the lens (i.e. the focal length).

FIG. 2B provides several depictions provided at different rotations of an exemplary multi-lens arrangement 250 shown as a hybrid lens 250 that includes a one dimensional positive lens 255 that provides a short range extended beam portion in a vertical direction such as short range extended vertical beam portion 180(*a*) shown in FIG. 1 integrated with converging lens 260 that provides a long range small divergence beam portion along a horizontal plane such as long range small divergence beam portion 180(*b*) shown in FIG. 1. One dimensional lens 255 and converging lens 260 share an identical lens center to provide coaxial alignment of the vertically and horizontally oriented beam portions. The center depiction shows the alignment of the one dimensional lens 255 in a typical embodiment wherein the incident light beam has a large beam divergence.

The converging lens 260 is seen to include a central strip-shaped gap portion in which the one dimensional lens 255 (e.g., cylinder lens) is positioned within. Although the strip-shaped gap is shown extending the full length of multi-lens arrangement, in other embodiments the one dimensional lens 255 does not extend the full dimension of multi-lens arrangement 250, and is thus surrounded by converging lens 260. The width dimension of one dimensional lens 255 is typically selected so that 10 to 50% of the energy of the incident modulated light beam is incident on one dimensional lens 255, with the remainder of the energy incident on converging lens 260.

Hybrid lens 250 is shown including a lens housing 245, wherein the hybrid lens 250 is contained within the housing 245. When one dimensional lens 255 is embodied as a cylinder lens and the cylinder lens is flat (or straight) cylinder lens (i.e. neither concave or convex in the longitudinal direction), the horizontal meridian looks like a cross section of a spherical lens and thus provides focusing in the horizontal plane and the vertical meridian looks like a plane wedge so that is has no lensing effect in the vertical direction. Accordingly, in operation, hybrid lens 250 oriented such that the one dimensional lens 255 has its single focusing dimension be the horizontal dimension transforms an incident point of light into a line image in the horizontal direction, but does not affect the beam in the vertical direction.

In the case one dimensional lens 255 comprises a cylinder lens, the longitudinal axis of the cylinder lens can be positioned parallel to the vertical plane (e.g., the center depiction in FIG. 2B). In such an orientation, the divergence of the beam in the vertical direction would be unaffected by one dimensional lens 255 so that in the wide divergence beam case (e.g., laser diode light source without lensing) the beam divergence in the vertical direction remains wide, while one dimensional lens 255 and converging lens 260 focus the wide divergence beam in the horizontal direction to provide a long range small divergence beam portion.

However, in certain embodiments, the one dimensional lens, such as a cylinder lens, can include a slight curvature to modify the beam characteristics in the direction that would be unaffected by an entirely one dimensional lens, such as a straight cylinder lens as described above. This embodiment allows the FIG. 2B arrangement to be modified to add a degree of beam profiling in the vertical direction that allows tailoring for particular applications. In the case of a cylinder lens, a slight curve in the lens shape along the longitudinal axis is generally referred to as a "sphero-cylinder" lens which, by definition, has refractive power in each of the two principal meridians. As used herein, a "curved one dimensional lens" has a refractive power in its primary meridian (e.g., horizontal) direction is at least five (5) times, and is generally at least ten (10) times, the refractive power in the secondary meridian (e.g., vertical).

FIG. 2C is a depiction of an exemplary multi-lens arrangement 265 shown as a hybrid lens 265 that includes a curved one dimensional lens 270 shown as a curved cylinder lens 270 that provides a short range extended beam portion in a vertical direction that has reduced beam divergence. FIG. 2C includes a separate depiction for curved cylinder lens 270 that makes clear the slight curvature in the longitudinal direction of the cylinder lens. The reduced beam divergence can be compared to short range extended vertical beam portion 180(a) shown in FIG. 1, such as resulting from use of hybrid lens 250 that includes a straight one dimensional lens as shown in FIG. 2B and described above. Analogous to hybrid lens 250, curved one dimensional lens 270 and converging lens 275 share an identical lens center to provide coaxial alignment of the vertically and horizontally oriented beam portions.

In a typical application using the embodiment shown in FIG. 2C, the slightly curved cylinder lens can be used for the wide divergence beam case (e.g., laser diode without lensing), where the converging lens provides relatively strong focus in the horizontal and the slight curve of the cylinder provides some beam focusing in the vertical direction slightly, such as from 10 degrees of divergence to a lower divergence, such as 6 degrees. As described below, relative to FIG. 3C, the lensing shown in FIG. 2C can reduce the vertical divergence of the beam such as from 10 degrees (characteristic laser diode beam divergence) to 6 degrees to reduce the close in beam height to be more consistent with an actual person target and at the same time, extend the vertical extension of the hit profile a farther distance to insure the center of mass shots will be sensed by detectors on a targets head. However, in some applications the slight curve of the cylinder can also be to defocus the beam in the vertical direction slightly, such as from 10 degrees of divergence achieve a higher divergence, such as 15 degrees.

In one embodiment hybrid lens 250 or hybrid lens 265 is formed using a mold together with a suitable molding process. In one particular embodiment, injection molding is used, wherein an acrylic material is injection molded to form hybrid lens 250 or 265. Exemplary materials include polycarbonate and acrylic.

FIG. 2D provides a depiction of a one dimensional negative lens shown as a negative cylinder lens 280 for generating a vertically elongated beam portion from a low divergence modulated beam while not affecting the low divergence horizontal beam portion, according to another disclosed embodiment. As described above, this arrangement is in case the incident light beam light has a small divergence in both the vertical and horizontal directions. Cylinder lens 280 is aligned with its longitudinal axis along the horizontal plane to provide vertical beam expansion in the form of light sheet 290 shown in FIG. 2D, but to not affect the low divergence light beam portion in the horizontal direction.

As described above, lens optics described herein provide a coaxially aligned, vertically elongated beam portion in a vertical direction and low divergence (i.e. long range) horizontal beam portion along the horizontal plane, and can use a single optical beam source. This feature not only allows a more even-sized beam size throughout the entire transmission length, but it also makes the task of aligning various output sources significantly more efficiently achieved as compared to conventional arrangements. Disclosed embodiments also allow the photodetector center to be remote (e.g., on the head) from the center of the beam being transmitted (e.g., at the torso). Moreover, disclosed embodiments reduced transverse axis scatter as compared to systems requiring at least two optical beams. In view of their generally low cost nature and ability to utilize head only photodetectors, even for close position hits, disclosed embodiments are expected to find a variety of applications including simulation and training as described above, as well as virtual environments.

EXAMPLES

Disclosed embodiments are further illustrated by the following specific Examples, which should not be construed as limiting the scope or content of embodiments of the invention in any way.

Figure 3A:
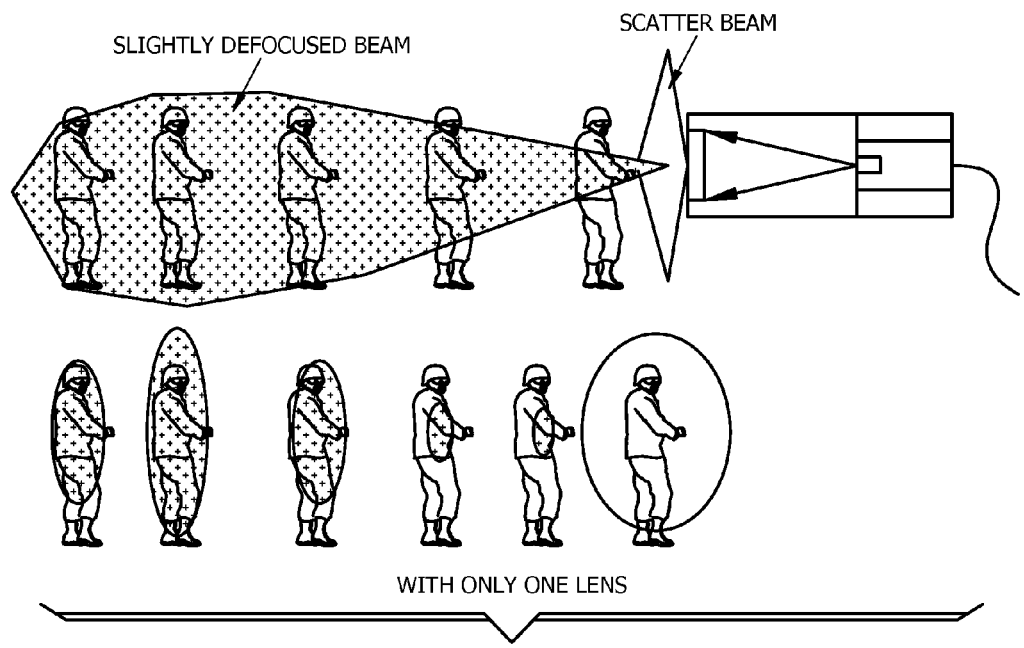
Figure 3B:
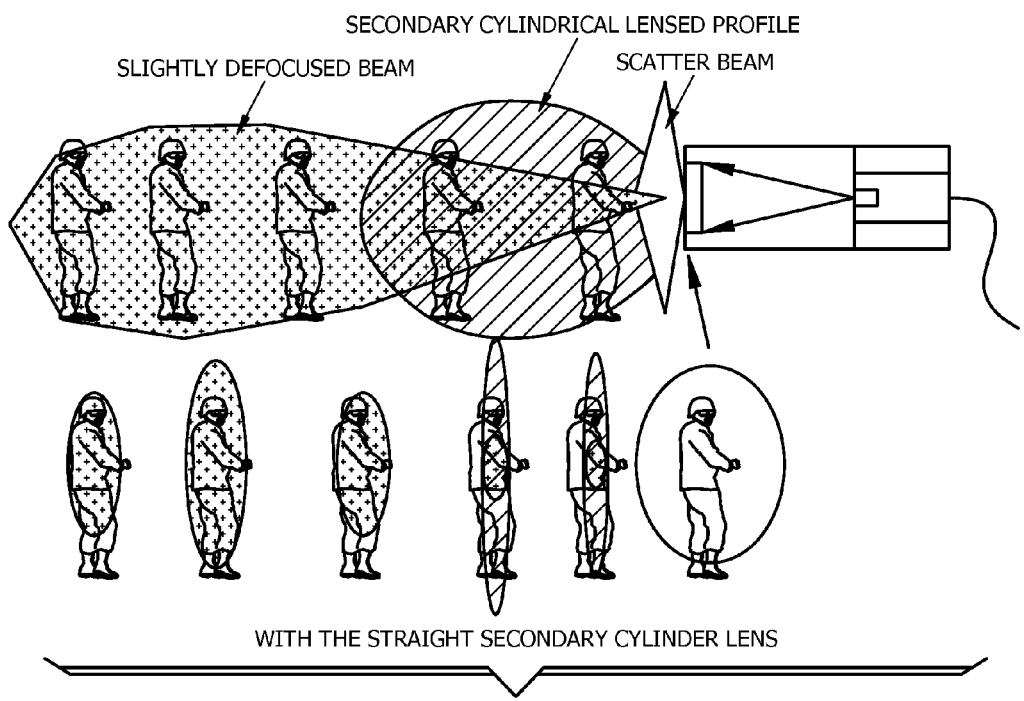
Figure 3C:
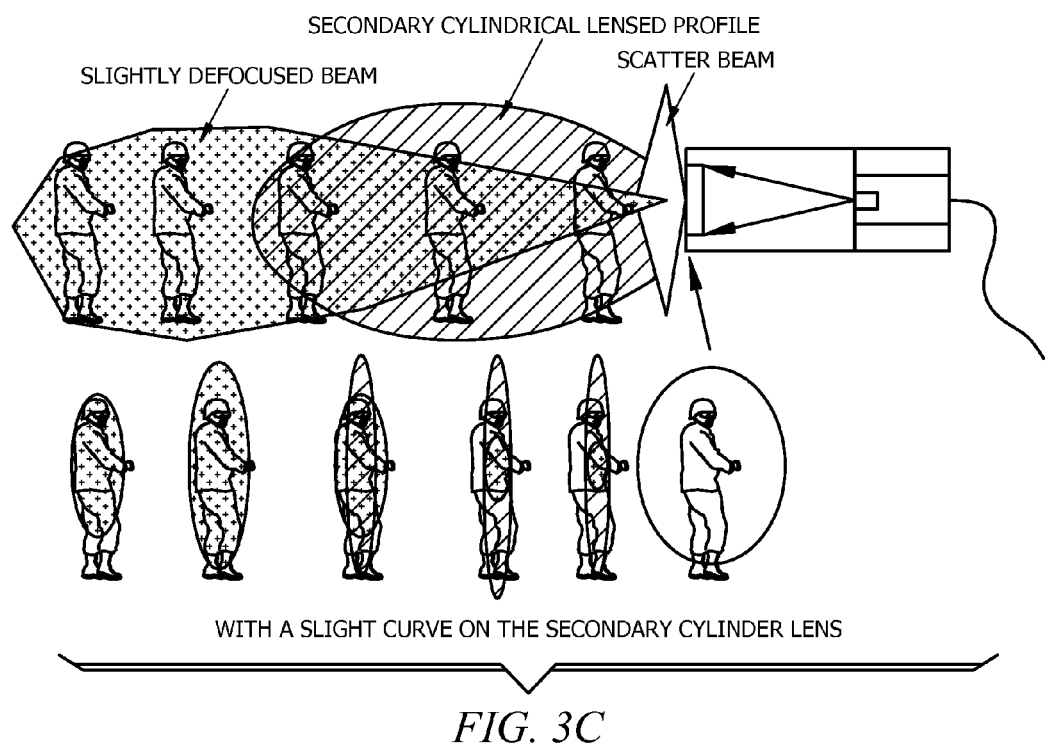

FIGS. 3A-C show depictions of the resulting beam profile and hit profile using a wide beam divergence light source, such as an un-lensed laser diode having significant beam divergence for different lens embodiments. FIG. 3A shows a depiction of the resulting beam profile when the lens is a conventional spherical converging lens. Note the hit profile depicted. FIG. 3B shows a depiction of the resulting beam profile when the lens is a composite or hybrid lens as disclosed herein, such as hybrid lens 250 shown in FIG. 2B that includes a straight cylinder lens. Note the improved hit profile depicted as compared to the hit profile depicted in FIG. 3A.

FIG. 3C shows a depiction of the resulting beam profile when the lens is a composite or hybrid lens as disclosed herein, such as hybrid lens 265 shown in FIG. 2C that includes a curved cylinder lens. The lensing can be seen to reduce the vertical divergence of the beam such as from 10 degrees (characteristic laser diode beam divergence) to 6 degrees to reduce the close in beam height to be more consistent with an actual person target and at the same time, extend the vertical extension of the hit profile a farther distance to insure the center of mass shots will be sensed by detectors on a player's head.

While various embodiments of the invention have been described above, it should be understood that they have been presented by way of example only, and not limitation. Numerous changes to the disclosed embodiments can be made in accordance with the disclosure herein without departing from the spirit or scope of the disclosed embodiments. For example, although a single one dimensional lens is generally described herein, for applications desiring a highly collimated vertical beam portion, a pair of one dimensional lenses with one following the other may be used in a configuration analogous to a beam expanding telescope. Thus, the breadth and scope of embodiments of the invention should not be limited by any of the above explicitly described embodiments. Rather, the scope of the invention should be defined in accordance with the following claims and their equivalents.

Although the embodiments of invention have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting to embodiments of the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which embodiments of the invention belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. An interactive system, comprising:
   a head mounted apparatus comprising at least one photodetector affixed thereto, and
   a firing apparatus comprising a trigger-able activation mechanism, wherein said firing apparatus comprises:
      a light generating device for emitting a modulated light beam that includes information regarding said firing apparatus upon triggering of said firing apparatus in a direction toward said head mounted apparatus, and
      lens optics positioned in a path of said modulated light beam comprising a one dimensional lens for beam shaping said modulated light beam to provide a shaped modulated beam comprising a low divergence horizontal beam portion in a horizontal direction and a vertically elongated beam portion in a vertical direction;
   wherein said lens optics comprises a multi-lens arrangement comprising (i) a converging lens and (ii) said one dimensional lens, wherein said converging lens and said one dimensional lens have non-overlapping optics, and wherein said one dimensional lens provides said vertically elongated beam portion and said converging lens provides said low divergence horizontal beam portion;
   wherein said one dimensional lens comprises a cylinder lens or a one dimensional gradient index (GRIN) lens, or
   wherein said one dimensional lens comprises a negative lens that is aligned to provide said vertically elongated beam portion and to not affect said modulated light beam in said horizontal direction.

2. The system of claim 1, wherein the system is a combat training system, wherein the head mounted apparatus is mounted to or incorporated within a helmet, and wherein the firing apparatus is a weapon comprising a barrel, wherein the modulated light beam travels in a direction in which the barrel is aimed when the weapon is activated,
   and wherein the low divergence horizontal beam portion corresponds to a beam divergence of ≤1 degree in a direction along the horizontal direction, while the vertically elongated beam portion corresponds to a beam divergence of ≥10 degrees.

3. The system of claim 1, wherein said lens optics comprises said multi-lens arrangement comprising (i) said converging lens and (ii) said one dimensional lens, wherein said converging lens and said one dimensional lens have non-overlapping optics, wherein said one dimensional lens provides said vertically elongated beam portion and said converging lens provides said low divergence horizontal beam portion, and wherein said multi-lens arrangement comprises a hybrid lens arrangement, said converging lens and said one dimensional lens sharing an identical lens center, said converging lens including a central gap portion that is oriented along said vertical direction, wherein said one dimensional lens is positioned within said central gap portion.

4. The system of claim 1, wherein said lens optics comprises said multi-lens arrangement comprising (i) said converging lens and (ii) said one dimensional lens, wherein said converging lens and said one dimensional lens have non-overlapping optics, wherein said one dimensional lens provides said vertically elongated beam portion and said converging lens provides said low divergence horizontal beam portion, and wherein said converging lens comprises a plano-convex or a biconvex lens.

5. The system of claim 1, wherein said one dimensional lens comprises said cylinder lens, and wherein said cylinder lens comprises a curved cylinder lens.

6. The system of claim 1, wherein said light generating device comprises a non-lensed laser diode.

7. The system of claim 1, wherein said photodetector is exclusively on said head mounted apparatus, said modulated light beam consists of a single modulated light beam, and said shaped modulated beam extends in said vertical direction at least from a center of a torso to a head of a target wearing or comprising the head mounted apparatus while said target is standing at a distance of <10 meters.

8. The system of claim 1, wherein said lens optics comprises said multi-lens arrangement comprising (i) said converging lens and (ii) said one dimensional lens, wherein said converging lens and said one dimensional lens have non-overlapping optics, and wherein said one dimensional lens provides said vertically elongated beam portion and said converging lens provides said low divergence horizontal beam portion, further comprising a single lens housing, wherein said multi-lens arrangement comprises a hybrid lens that is contained within said single lens housing, said converging lens and said one dimensional lens sharing an identical lens center, said converging lens including a central gap portion that is oriented along said vertical direction, wherein said one dimensional lens is positioned within said central gap portion.

9. The system of claim 1, wherein said lens optics comprises said multi-lens arrangement comprising (i) said converging lens and (ii) said one dimensional lens, wherein said converging lens and said one dimensional lens have non-overlapping optics, wherein said one dimensional lens provides said vertically elongated beam portion and said converging lens provides said low divergence horizontal beam portion, and wherein said multi-lens arrangement comprises a composite lens arrangement.

10. A method including at least one firing apparatus that is a physical object having an attached light generating device for emitting a single modulated light beam that includes information regarding said firing apparatus in a direction toward a target wearing or comprising a head mounted apparatus comprising at least one attached photodetector, comprising:
  beam shaping said single modulated light beam using lens optics positioned in a path of said single modulated light beam to simultaneously output a shaped modulated beam comprising a low divergence horizontal beam portion in a horizontal direction and a vertically elongated beam portion in a vertical direction;
  wherein said beam shaping utilizes a hybrid lens arrangement positioned in said path of said single modulated light beam comprising (i) a converging lens and (ii) a one dimensional lens, wherein said converging lens and said one dimensional lens share an identical lens center, and said converging lens includes a central gap portion that is oriented along said vertical direction, wherein said one dimensional lens is positioned within said central gap portion, or
  wherein said converging lens comprises a plano-convex or a biconvex lens and said one dimensional lens comprises a cylinder lens.

11. A system, comprising:
  a head mounted apparatus comprising at least one photodetector affixed thereto;
  a firing apparatus comprising a trigger-able activation mechanism, wherein said firing apparatus comprises:
    a light generating device consisting of a single non-lensed laser diode for emitting a modulated light beam that includes information regarding said firing apparatus upon triggering of said firing apparatus in a direction toward a target wearing or comprising said head mounted apparatus, and
    a hybrid lens arrangement positioned in a path of said modulated light beam comprising (i) a plano-convex or a biconvex lens and (ii) a cylinder lens having aligned centers and non-overlapping optics, said hybrid lens arrangement for beam shaping said modulated light beam to provide a shaped modulated beam having a low divergence horizontal beam portion in a horizontal direction and a vertically elongated beam portion in a vertical direction,
    wherein said plano-convex or biconvex lens and said cylinder lens share an identical lens center, said plano-convex or biconvex lens including a central gap portion that is oriented along said vertical direction, and wherein said cylinder lens is positioned within said central gap portion, wherein said cylinder lens provides said vertically elongated beam portion and said plano-convex or biconvex lens provides said low divergence horizontal beam portion.

12. The method of claim 10, wherein said one dimensional lens comprises said cylinder lens, and wherein said cylinder lens comprises a curved cylinder lens.

13. The method of claim 10, wherein said light generating device consists of a single light generating device and said modulated light beam consists of said single modulated light beam, wherein said photodetector is exclusively on said head mounted apparatus, and wherein said shaped modulated beam aimed at a center of a torso of said target while standing is detectable by said photodetector attached to said head mounted apparatus at a distance of <10 meters, and
  wherein the low divergence horizontal beam portion corresponds to a beam divergence of ≤1 degree in a direction along the horizontal direction, while the vertically elongated beam portion corresponds to a beam divergence of ≥10 degrees.

14. A firing apparatus comprising:
  a light generating device for emitting a modulated light beam that includes information regarding said firing apparatus upon triggering of said firing apparatus in a direction toward a target, and
  lens optics positioned in a path of said modulated light beam comprising a one dimensional lens for beam shaping said modulated light beam to provide a shaped modulated beam having a low divergence horizontal beam portion in a horizontal direction and a vertically elongated beam portion in a vertical direction;
    wherein said lens optics comprises a multi-lens arrangement comprising (i) a converging lens and (ii) said one dimensional lens, wherein said converging lens and said one dimensional lens have non-overlapping optics, and wherein said one dimensional lens provides said vertically elongated beam portion and said converging lens provides said low divergence horizontal beam portion;
  wherein said light generating device comprises an non-lensed laser diode; wherein said multi-lens arrangement comprises a hybrid lens, said converging lens comprising a plano-convex or a biconvex lens and said one dimensional lens comprises a cylinder lens and non-overlapping optics, wherein said plano-convex or biconvex lens and said cylinder lens share an identical lens center, said plano-convex or biconvex lens including a central gap portion that is oriented along said vertical direction, and wherein said cylinder lens is positioned within said central gap portion, or wherein said one dimensional lens comprises a negative lens that is aligned to provide said vertically elongated beam portion and to not affect said modulated light beam in said horizontal direction.

15. The firing apparatus of claim 14, wherein said lens optics comprises said multi-lens arrangement comprising (i) said converging lens and (ii) said one dimensional lens, wherein said converging lens and said one dimensional lens have non-overlapping optics, wherein said one dimensional lens provides said vertically elongated beam portion and said converging lens provides said low divergence horizontal beam portion, and wherein said multi-lens arrangement comprises a hybrid lens arrangement, said converging lens and said one dimensional lens sharing said identical lens center, said converging lens including said central gap portion that is oriented along said vertical direction, wherein said one dimensional lens is positioned within said central gap portion.

16. The firing apparatus of claim 15, wherein said converging lens comprises said plano-convex or a biconvex lens and wherein said one dimensional lens comprises said cylinder lens.

17. The firing apparatus of claim 14, wherein the low divergence horizontal beam portion corresponds to a beam divergence of $\leq 1$ degree in a direction along the horizontal direction, while the vertically elongated beam portion corresponds to a beam divergence of $\geq 10$ degrees.

* * * * *